United States Patent
Raddant

(10) Patent No.: US 7,295,825 B2
(45) Date of Patent: Nov. 13, 2007

(54) DIVERSITY ANTENNA ARRANGEMENT

(75) Inventor: Hans-Joachim Raddant, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/258,498

(22) PCT Filed: Feb. 21, 2002

(86) PCT No.: PCT/DE02/00606

§ 371 (c)(1),
(2), (4) Date: May 30, 2003

(87) PCT Pub. No.: WO02/069522

PCT Pub. Date: Sep. 6, 2002

(65) Prior Publication Data

US 2003/0181222 A1    Sep. 25, 2003

(30) Foreign Application Priority Data

Feb. 27, 2001  (DE) ................. 101 09 359

(51) Int. Cl.
*H04B 1/06* (2006.01)
(52) U.S. Cl. ............... 455/277.1; 455/277.2; 455/273; 455/269; 455/279.1; 342/432; 342/374; 343/876; 343/853; 348/725; 348/706
(58) Field of Classification Search .............. 455/25, 455/63, 413.3, 133, 83, 270.1, 270.2, 277.1, 455/277.2, 273, 269, 279.1; 348/725, 706; 342/280, 270, 432, 374; 375/348; 343/876, 343/853
See application file for complete search history.

(56) References Cited

U.S. PATENT DOCUMENTS

| | | | | |
|---|---|---|---|---|
| 5,818,543 A | * | 10/1998 | Lee | ............................. 348/725 |
| 6,029,057 A | * | 2/2000 | Paatelma et al. | ......... 455/277.2 |
| 6,226,507 B1 | * | 5/2001 | Ramesh et al. | .......... 455/277.1 |
| 6,574,461 B1 | * | 6/2003 | Skold | ...................... 455/277.2 |
| 6,636,729 B1 | * | 10/2003 | Hiramatsu et al. | ....... 455/278.1 |
| 6,741,838 B2 | * | 5/2004 | Tsujimoto | .................... 455/101 |

FOREIGN PATENT DOCUMENTS

| | | |
|---|---|---|
| DE | 36 34 439 | 4/1988 |
| EP | 0 201 977 | 11/1986 |
| EP | 0 274 157 | 7/1988 |

* cited by examiner

*Primary Examiner*—Joseph Feild
*Assistant Examiner*—Randy Peaches
(74) *Attorney, Agent, or Firm*—Kenyon & Kenyon LLP

(57) ABSTRACT

A diversity antenna arrangement to reduce cost and the number of switching operations between different antennas includes an antenna changeover switch for switching between antennas, and an evaluation circuit for evaluating reception quality of a signal derived from a signal received from at least one of the antennas and conveyed to a receiving device via the antenna changeover switch. The evaluation circuit emits an evaluation signal based on the determined reception quality. A control device drives the antenna changeover switch based on the evaluation signal. A weighting device, using a first coefficient, weights the signal conveyed to the receiving device via the antenna changeover switch, and using a second coefficient, weights a signal received from at least one further antenna. A summing circuit adds the weighted signals. A regulating circuit generates the coefficients to minimize the temporal amplitude fluctuations of the composite signal, which is evaluated by the evaluation circuit.

12 Claims, 2 Drawing Sheets

DIVERSITY ANTENNA ARRANGEMENT

BACKGROUND INFORMATION

Figure 1:
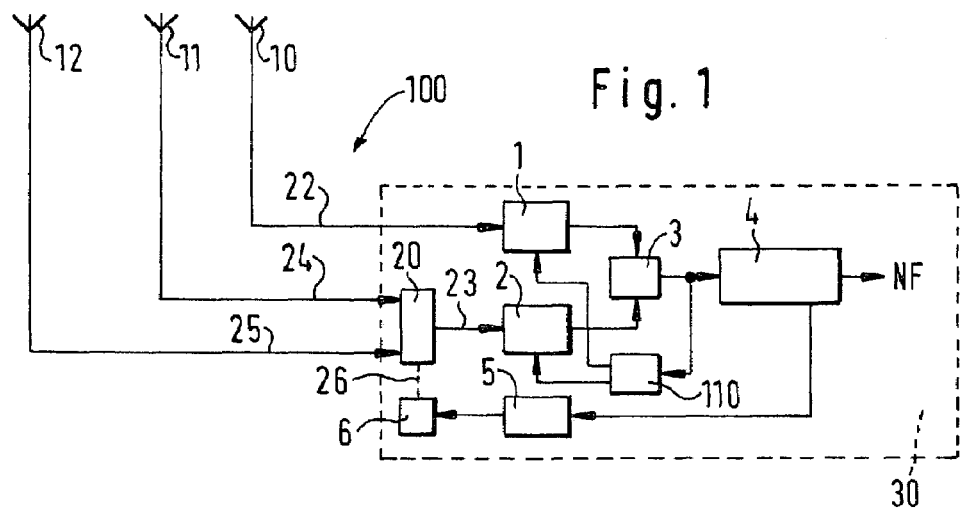

The present invention relates to a diversity antenna arrangement according to the species of the main claim.

A diversity antenna arrangement is known from European Patent 02 01 977 A2 for the mobile reception of frequency-modulated vibrations using a receiver, at least two antennas, and a diversity processor, to which an IF (intermediate frequency) signal is fed from the receiver. The diversity processor checks the supplied IF signal and switches over to a different antenna or a different linear combination of antenna signals if the IF signal has interference. Interference is detected if an amplitude break exceeds an amplitude threshold and simultaneously the frequency swing exceeds a frequency swing threshold. An advantage of this method is that, in addition to the circuit arrangement for detecting interference, only an antenna changeover switch is needed. This method can therefore be economically realized in devices, especially if the circuit arrangement for detecting interference is located in a car radio, where the IF amplifier or the demodulator makes available the signals to be evaluated.

Nevertheless, the switchover operation to a different antenna or a different linear combination of antenna signals, especially when weak radio signals are being received, is audible in the loudspeaker. As a result, the diversity antenna arrangement adds further interference to reception signals that already have interference. When the switching is more frequent, the interference is more pronounced.

From German Patent 36 34 439 A1, a method and a circuit arrangement for receiving radio waves are known. In this context, a diversity method is described in which the signal received from each antenna is converted in the receiver to the intermediate frequency IF. The IF signals of the individual antennas are weighted using coefficients, and the weighted signals are added to yield a composite signal. The coefficients are generated in the sense of minimizing the temporal amplitude fluctuations of the IF composite signal.

In this method, it is advantageous that no switching is performed and therefore no switching noises are audible. For this purpose, for each antenna, in addition to the circuit arrangement for regulating the coefficients, a complete radio input part is required, having a pre-stage, a mixer, and an IF filter.

ADVANTAGES OF THE INVENTION

In contrast, the diversity antenna arrangement according to the present invention having the features of the main claim has the advantage that, in addition to an antenna changeover switch for switching between different antennas, an evaluation circuit for evaluating the reception quality of a signal that is derived from a received signal of at least one of the antennas, the signal being fed via the antenna changeover switch to a receiving device, and for outputting an evaluation signal that is formed as a function of the detected reception quality, and a control device, which controls the antenna changeover switch as a function of the evaluation signal, a weighting device is provided which, using a first coefficient, weights the signal that is supplied via the antenna changeover switch to the receiving device, that at least one further antenna is provided whose received signal is weighted by the weighting device using a second coefficient, that a composite circuit is provided which adds the signals that were weighted using the coefficients, that a regulating circuit is provided which generates the coefficients in the sense of minimizing the temporal amplitude fluctuations of the composite signal, and that the evaluation circuit evaluates the reception quality of the composite signal. In this way, a diversity antenna arrangement is created which makes it possible to reduce the number of switchover operations, while reducing the expense for components. In this manner, costs are saved.

As a result of the measures indicated in the subclaims, advantageous refinements and improvements of the diversity antenna arrangement indicated in the main claim are possible.

It is particularly advantageous that the antenna changeover switch is linked to the weighting device via a connecting line, on which, on the one hand, the received signals of at least one of the antennas are transmitted to the weighting device, and on which, on the other hand, the evaluation signals are transmitted from the evaluation circuit to the control circuit. In this way, it is possible to increase the functionality of the connecting line and to reduce the connection costs.

A further advantage derives from the fact that a low-pass filter is arranged at the output of the evaluation circuit and/or at the input of the control device. In this way, it is prevented that high-frequency interference of the evaluation circuit and/or of the control device is superimposed on the HF (high frequency) signals received from the antennas. On the other hand, the evaluation circuit and the control device are prevented from being disturbed by the received high-frequency signals.

A further advantage can be seen in the fact that the at least one further antenna can be connected to the weighting device via a further antenna changeover switch. In this way, a plurality of antennas can be subject to changeover switching at the same time, and antenna combinations can be realized that are entirely independent of each other.

It is also advantageous that the control device also drives the additional antenna changeover switch. In this way, the functionality of the control device is increased, and no additional component is required.

A further advantage to be seen in the fact that a further control device is provided which drives the further antenna changeover switch. In this way, it is possible to realize a greater number of different antenna combinations for the diversity reception.

It is especially advantageous that the combinations of antennas that can be connected at the same time to the receiving device have varying directional characteristics. In this way, it is possible to assure that the different combinations represent genuine alternatives for the diversity reception and that they do not receive signals which basically pick up the same amount of interference, so that switching over between the various combinations brings with it no improvement in signal reception.

DRAWING

Exemplary embodiments of the present invention are depicted in the drawing and are discussed in greater detail in the description below.

Figure 2:
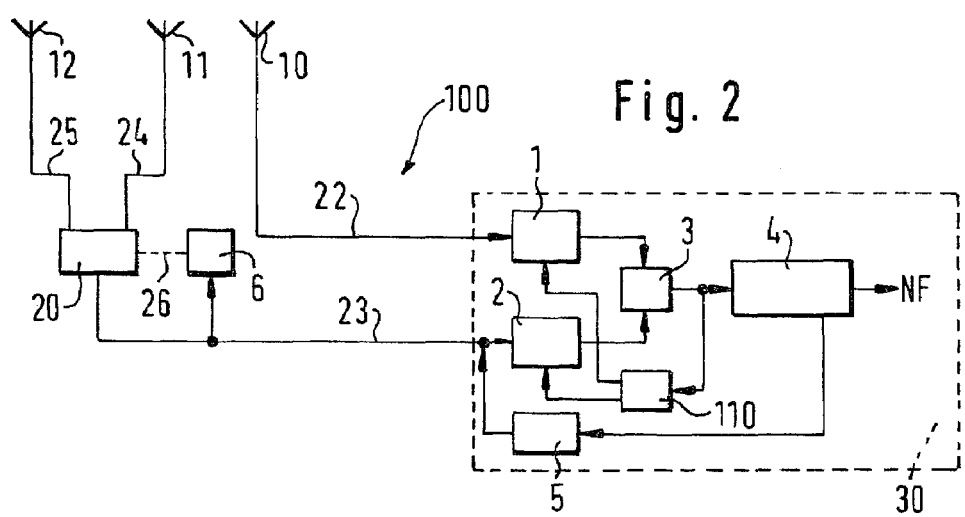
Figure 3:
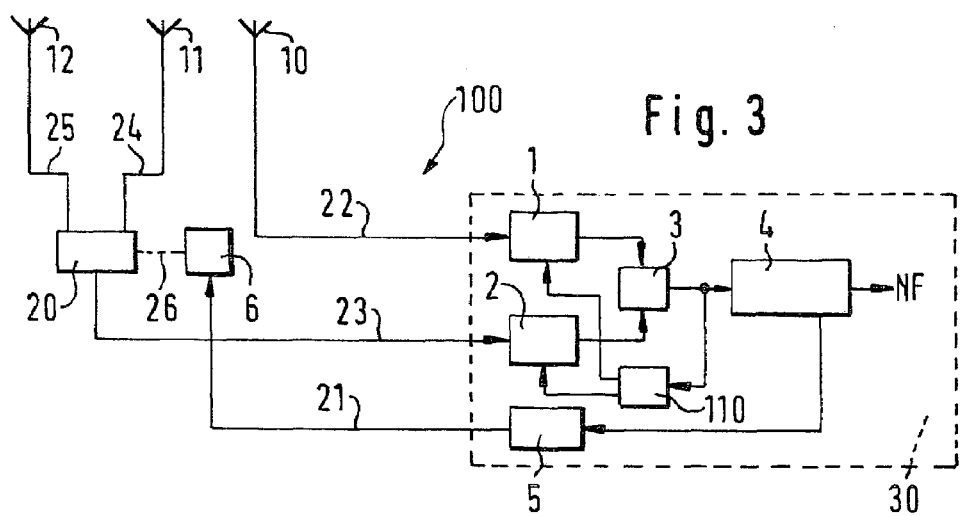
Figure 4:
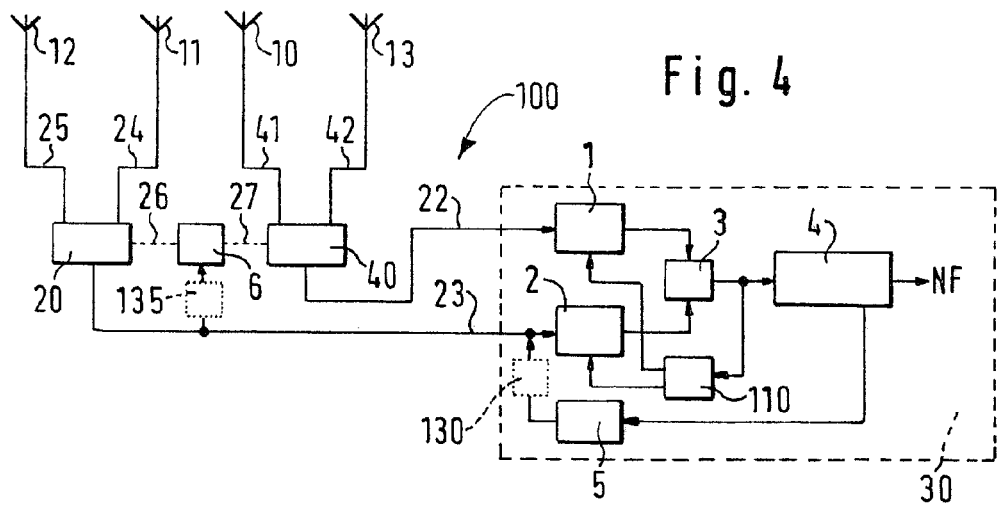
Figure 5:
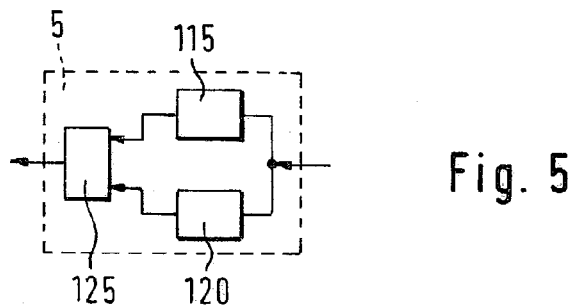
Figure 6:
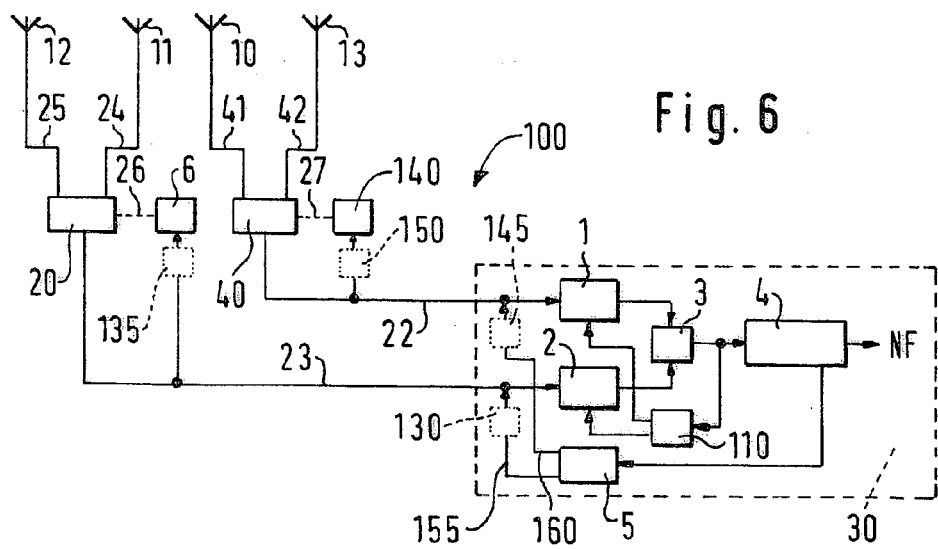

FIG. 1 depicts a block diagram of a first embodiment of a diversity antenna arrangement according to the present invention, FIG. 2 depicts a block diagram of a second embodiment of the diversity antenna arrangement according to the present invention, FIG. 3 depicts a block diagram of a third embodiment of the diversity antenna arrangement according to the present invention, FIG. 4 depicts a block diagram of a fourth embodiment of the diversity antenna arrangement according to the present invention, FIG. 5 depicts a block diagram of an evaluation circuit, and FIG. 6 depicts block diagram of a fifth embodiment of the diversity antenna arrangement according to the present invention.

DESCRIPTION OF THE EXEMPLARY EMBODIMENTS

In FIG. 1, 100 designates a diversity antenna arrangement having a first antenna 10, a second antenna 11, and a third antenna 12. First antenna 10 supplies a first received signal, second antenna 11 supplies a second received signal, and third antenna 12 supplies a third received signal. Received signals of antennas 10, 11, 12 are fed to a receiver 30, which can be configured, for example, as a radio receiver. In this context, the radio receiver can be configured, specifically, so as to be mobile and, for example, as a car radio. Receiver 30 includes a first weighting module 1, to which the first received signal is fed. First weighting module 1 represents an input circuit, which transforms the first received signal into a first IF (intermediate frequency) signal, multiplies it by a first coefficient, and thus weights it. The first IF signal, weighted in this manner, is fed to a summing circuit 3, which on the output side is connected to receiving device 4. Receiver 30 also includes a first antenna changeover switch 20, to which the second received signal and the third received signal are fed, and which selectively connects second antenna 11 or third antenna 12 to a second weighting module 2, which transforms the signal received from second antenna 11 or third antenna 12 into a second IF signal, multiplies the second IF signal by a second coefficient, and thus weights it. The second IF signal, weighted in this manner, is subsequently fed to summing circuit 3. Summing circuit 3 adds the weighted first IF signal and the weighted second IF signal yielding an IF composite signal, and feeds this IF composite signal to receiving device 4. Receiving device 4 amplifies the IF composite signal and carries out a demodulation of the amplified IF composite signal, so that an LF (low-frequency) composite signal is present at the output of receiving device 4. For acoustical reproduction, the LF composite signal can be supplied via further receiving stages, not depicted in FIG. 1, to a sound reproducing device, for example, a loudspeaker.

Receiver 30 also includes a regulating circuit 110, to which is fed from receiving device 4 either the amplified IF composite signal or the demodulated amplified IF composite signal or, as depicted in the Figures, the IF composite signal directly emitted by summing circuit 3, and which generates the first coefficient of the first weighting module and the second coefficient of the second weighting module in the sense of minimizing the temporal amplitude fluctuations of the signal fed to regulating circuit 110 from receiving device 4. First weighting module 1 and second weighting module 2, in this context, constitute a weighting device of receiver 30. The signal that is fed to regulating circuit 110 and that is designated hereinafter as the weighted composite signal is also fed to an evaluation circuit 5 of receiver 30, which on the output side is connected to a first control device 6. First control device 6 sends a first control signal to first antenna changeover switch 20. First antenna changeover switch 20 selectively connects second antenna 11 or third antenna 12 to second weighting module 2 as a function of the first control signal. The connecting line between first antenna changeover switch 20 and second weighting module 2 is designated by reference numeral 23 and is hereinafter termed the second connecting line. The connecting line between first antenna 10 and first weighting module 1 is designated by reference numeral 22 and is hereinafter termed the first connecting line. The connecting line between second antenna 11 and first antenna changeover switch 20 is designated by reference numeral 24 and is hereinafter termed the third connecting line. The connecting line between third antenna 12 and first antenna changeover switch 20 is designated by reference numeral 25 and is hereinafter termed the fourth connecting line. The connecting line between first control device 6 and first antenna changeover switch 20 is designated by reference numeral 26 and is hereinafter termed the control line. First antenna changeover switch 20 therefore electrically connects either third connecting line 24 to second connecting line 23 or fourth connecting line 25 to second connecting line 23. For the switchover between second antenna 11 and third antenna 12, and for their selective connection to second connecting line 23, it is possible to provide in first antenna changeover switch 20, for example, PIN diodes, which, depending on the drive, can be switched to the conducting or blocking state by the first control signal of first control device 6. In this context, first control device 6 drives first antenna changeover switch 20 as a function of the evaluation signal supplied from evaluation circuit 5. Evaluation circuit 5, for this purpose, evaluates the reception quality of the weighted composite signal. For this purpose, evaluation circuit 5 can include an interference threshold circuit in accordance with FIG. 5. The interference threshold circuit checks as to whether the interference of the weighted composite signal has exceeded a preestablished interference threshold. If this is the case, then evaluation circuit 5 emits an evaluation signal which causes first control device 6 to switch first antenna changeover switch 20 to the respective other antenna. Otherwise, no evaluation signal of this type is sent to first control device 6, and no switchover operation is initiated in first antenna changeover switch 20.

For this purpose, the interference threshold circuit can include an amplitude threshold value detector 115, to which is fed the weighted composite signal, in accordance with FIG. 5. If amplitude threshold value detector 115 establishes an amplitude break of the weighted composite signal, which exceeds a preestablished amplitude threshold, then evaluation circuit 5 emits an evaluation signal, which causes first control device 6 to switch first antenna changeover switch 20 to the antenna that heretofore has not been connected to second weighting module 2. Otherwise, no switchover operation is initiated.

In addition, the interference threshold circuit according to FIG. 5 can also include a frequency swing threshold value detector 120. The latter is particularly well-suited for receiving frequency-modulated signals. The weighted composite signal is also fed to frequency swing threshold value detector 120. The output of amplitude threshold value detector 115 and the output of frequency swing threshold value detector 120 are fed to an AND gate 125 as a logic element, whose output signal constitutes the evaluation signal. A switchover operation is initiated if the output signal of logic element 125 is HIGH. Amplitude threshold value detector 115 produces a HIGH signal, when an amplitude break of the weighted composite signal exceeds the preestablished amplitude threshold. Frequency swing threshold value detector 120 emits a HIGH signal if a frequency swing pulse of the weighted composite signal exceeds a preestablished frequency swing threshold. This means that a switchover operation is only initiated if an amplitude break of the weighted composite signal exceeds the preestablished amplitude threshold, and simultaneously a frequency swing pulse of the weighted composite signal exceeds the preestablished frequency swing threshold. Through the coefficient weighting in weighting device 1, 2, a minimization of the temporal amplitude fluctuations of the weighted composite signal is carried out as described, so that in this way the frequency of the switching operations in first antenna changeover switch 20 can be reduced.

According to a second embodiment, as depicted in FIG. 2, the same reference numerals designate identical elements as in FIG. 1. In contrast to FIG. 1, in the second embodiment as depicted in FIG. 2, first antenna changeover switch 20 and first control device 6 are arranged outside of receiver 30. In this way, it is possible to arrange first antenna changeover switch 20 closer to second antenna 11 and third antenna 12. In this context, in accordance with the second exemplary embodiment, second connecting line 23 can also be used for transmitting high-frequency signals of second antenna 11 or third antenna 12 to second weighting module 2 and to transmit the evaluation signal emitted by evaluation circuit 5 to first control device 6. For this purpose, the output of evaluation circuit 5 and the input of first control device 6 are each connected to second connecting line 23. In this context, it can also be provided, as is indicated in FIG. 2 by the dotted lines, to protect the output of evaluation circuit 5, using a first low-pass filter 130, from interference by the high-frequency signals that are transmitted on second connecting line 23. In addition, it can also be prevented, using first low-pass filter 130, that high-frequency interference at the output of evaluation circuit 5 reaches the input of second weighting module 2. Additionally, or alternatively, it is possible at the input of first control device 6 to arrange a second low-pass filter 135, which protects the input of first control device 6 from high-frequency signals that are transmitted on second connecting line 23, and which also prevents high-frequency interference at the input of first control device 6 from reaching second weighting module 2 via second connecting line 23. First low-pass filter 130 and second low-pass filter 135, in this context, are dimensioned so that they are conductive for the evaluation signals, it being preferable to select the evaluation signals so that they are of lower frequency than the high-frequency signals received from second antenna 11 or third antenna 12.

First low-pass filter 130, in accordance with FIG. 2, can be set off from evaluation circuit 5, or it can be integrated in it. Second low-pass filter 135, in accordance with FIG. 2, can be set off from first control device 6, or it can be integrated in it.

In accordance with a third embodiment as depicted in FIG. 3, once again the same reference numerals designate identical elements as in the preceding Figures. The third exemplary embodiment, in accordance with FIG. 3, represents an alternative to the second exemplary embodiment in accordance with FIG. 2. In this context, second connecting line 23 is only used for transmitting the high-frequency received signals of second antenna 11 or third antenna 12, whereas, for the transmission of the evaluation signal from evaluation circuit 5 to first control device 6, a separate fifth connecting line 21 is used. Low-pass filtering for protection against the high-frequency interaction with second connecting line 23, described with regard to the second exemplary embodiment, is then not necessary in the third exemplary embodiment. In addition, in the third exemplary embodiment, as depicted in FIG. 3, first antenna changeover switch 20, by way of example, but not of necessity, can be located not inside receiver 30 but rather set apart therefrom in the vicinity of two antennas 11, 12, that are to be switched by first antenna changeover switch 20.

According to a fourth exemplary embodiment, as seen in FIG. 4, in which once again the same reference numerals designate identical elements as in the preceding Figures, in contrast to the second exemplary embodiment, as depicted in FIG. 2, first antenna 10 can be connected to first connecting line 22 via a sixth connecting line 41 and a second antenna changeover switch 40. Furthermore, a fourth antenna 13 is provided, which can also be connected to first connecting line 22 via a seventh connecting line 42 and second antenna changeover switch 40. Second antenna changeover switch 40, in this context, functions to selectively connect first antenna 10 or fourth antenna 13 to first weighting module 1. In this context, first antenna changeover switch 40, as depicted in FIG. 4, is also driven by first control device 6 via a second control line 27. In the fourth exemplary embodiment, as depicted in FIG. 4, just as in the second exemplary embodiment, as seen in FIG. 2, second connecting line 23 is jointly used for transmitting the evaluation signal. Whereas, in the case of the three exemplary embodiments described above, the received signals of first antenna 10 always went into the weighted composite signal, so that for creating the weighted composite signal, there was either a combination of first antenna 10 and second antenna 11 or a combination of first antenna 10 and third antenna 12, depending on the switching state in first antenna changeover switch 20, it is possible, in the fourth exemplary embodiment, as depicted in FIG. 4, to realize two antenna combinations that are entirely independent of each other, for creating the weighted composite signal. First antenna changeover switch 20 and second antenna changeover switch 40, in this context, are switched at the same time by first control device 6. Therefore, depending on the position of first antenna changeover switch 20 and of second antenna changeover switch 40, the following combination pairs can be realized, as alternatives: first antenna 10 can be combined with second antenna 11, and third antenna 12 can be combined with fourth antenna 13. Other combination possibilities in this specific realization are not possible. Alternatively, first antenna 10 can be combined with third antenna 12, and second antenna 11 with fourth antenna 13. In this specific realization, no further combinations are possible.

If a total of four antenna combinations are to be possible, then a second control signal, independent of the first control signal, must be fed to second antenna changeover switch 40. A corresponding fifth exemplary embodiment is indicated in FIG. 6, in which, in contrast to the fourth exemplary embodiment, as depicted in FIG. 4, no connection is provided between first control device 6 and second antenna changeover switch 40, and, for this purpose, a second control device 140 is provided, which is connected to second antenna changeover switch 40 via a second control line 27. In the fifth exemplary embodiment, as depicted in FIG. 6, identical reference numerals again characterize identical elements as in the exemplary embodiments described above. In accordance with the fifth exemplary embodiment, evaluation circuit 5 has a second output, which is connected to first connecting line 22, whereas the first output of evaluation circuit 5 is connected to second connecting line 23. In this context, in accordance with FIG. 6, the first output of evaluation circuit 5 is designated by reference numeral 155, and the second output of evaluation circuit 5 by reference numeral 160. In the exemplary embodiment as depicted in FIG. 2, just as in the exemplary embodiment as depicted in FIG. 6, second connecting line 23 is jointly used for transmitting the from first output 155 to transmit the evaluation signal emitted by evaluation circuit 5, for which purpose first control device 6 is also connected to second connecting line 23. Second control device 140 is connected to first connecting line 22, so that, in a corresponding manner, first connecting line 22 can also be used for the transmission of the evaluation signal emitted at second output 160 of evaluation circuit 5 to second control device 140. In accordance with second low-pass filter 135, arranged on the input side with respect to first control device 6, second control device 140, in accordance with FIG. 6, can have a fourth low-pass filter 150 on the input side. In accordance with first low-pass filter 130, arranged at first output 155 of evaluation circuit 5, evaluation circuit 5 at second output 160 can have a third low-pass filter 145. In this context, the low-pass filters, as was already described with regard to the second exemplary embodiment in FIG. 2, provide protection from high-frequency interference. In order to make possible four different antenna combinations for creating the weighted composite signal, it can be provided to connect the output of the interference threshold circuit, described in accordance with FIG. 5, alternatingly to first output 155 and to second output 160 of evaluation circuit 5, for which purpose a corresponding switch can be provided. In this way, it is possible to realize the following four antenna combinations: first antenna 10 can be combined with second antenna 11 or third antenna 12, and fourth antenna 13 can be combined with second antenna 11 or third antenna 12. In accordance with the third exemplary embodiment as depicted in FIG. 3, the fifth exemplary embodiment as depicted in FIG. 6 can also be modified such that first output 155 of evaluation circuit 5 is directly connected to the input of first control device 6, and not via the second connecting line 23, and that second output 160 of evaluation circuit 5 is directly connected to the input of second control device 140. In this case, it is no longer necessary to have any low-pass filters for preventing high-frequency interference.

Antenna changeover switches 20, 40 can be located either in the vicinity of antennas 10, 11, 12, 13, set apart from receiver 30, as is depicted in FIG. 6 by way of example, or they can be located in receiver 30 itself, by analogy to the first specific embodiment.

The antennas in the individual exemplary embodiments are mounted such that the directional patterns of the possible antenna combinations have varying characteristics. If, in an arrangement of antennas of this type, interference persistently arises in one antenna combination, then the probability is high that the other antenna combination or combinations, due to their different directional pattern characteristics, will have more or less interference, but not exactly the same amount, so that the diversity function of diversity antenna arrangement 100 can be assured. It is therefore decisive for this purpose that the combinations of antennas that can be simultaneously connected to receiver 30, or to receiving device 4, via first antenna changeover switch 20 and, optionally, via second antenna changeover switch 40, have varying directional characteristics.

The present invention is not limited to the use of one or two antenna changeover switches. Rather, any number of antenna changeover switches can be used in the manner described, and any number of assigned weighting modules can be used. In addition, the number of antennas that can be connected from one antenna changeover switch to receiver 30 is not limited to two, but can also be greater. In addition, any number of antennas can be fixedly connected to receiver 30 and to an associated weighting module, just as first antenna 10 in accordance with the first exemplary embodiment. In one exemplary embodiment of receiver 30 as a car radio, the antennas are mounted on the corresponding vehicle such that the desired varying directional characteristics are produced as described.

What is claimed is:

1. A diversity antenna arrangement, comprising:
    a plurality of different antennas;
    an antenna changeover switch for switching between the different antennas to provide an output signal that represents a signal received from one of the different antennas;
    an evaluation circuit for evaluating a reception quality of a signal that is derived from a received signal of at least one of the different antennas and for generating an evaluation signal as a function of the reception quality;
    a receiving device to which the signal is fed via the antenna changeover switch;
    a control device for driving the antenna changeover switch as a function of the evaluation signal;
    a first weighting module that, using a first coefficient, weights the output signal of the changeover switch to provide a first weighted signal;
    at least one further antenna providing a further received signal;
    a second weighting module that, using a second coefficient, weights the further received signal to provide a second weighted signal;
    a summing circuit for producing a weighted composite signal by adding the first weighted signal and the second weighted signal; and
    a regulating circuit for generating the first coefficient and the second coefficient by minimizing a temporal amplitude fluctuation of an amplitude of the weighted composite signal, wherein:
        the evaluation circuit evaluates a reception quality of the weighted composite signal.

2. The diversity antenna arrangement as recited in claim 1, wherein:
    the evaluation circuit includes an interference threshold circuit, and
    the evaluation signal causes the control device to switch the antenna changeover switch, if an interference of the weighted composite signal exceeds a preestablished interference threshold.

3. The diversity antenna arrangement as recited in claim 2, wherein:
    the interference threshold circuit includes an amplitude threshold value detector, and
    the evaluation signal causes the control device to switch the antenna changeover switch if an amplitude break of the weighted composite signal exceeds a preestablished amplitude threshold.

4. The diversity antenna arrangement as recited in claim 3, wherein:
    the interference threshold circuit includes a frequency swing threshold value detector, and
    the evaluation signal causes the control device to switch the antenna changeover switch if a frequency swing pulse of the weighted composite signal exceeds a preestablished frequency swing threshold.

5. The diversity antenna arrangement as recited in claim 1, further comprising:

a connecting line via which the antenna changeover switch is connected to the first weighting module, wherein:
- the output signal is transmitted to the first weighting module over the connecting line, and
- the evaluation signal is transmitted from the evaluation circuit to the control circuit.

6. The diversity antenna arrangement as recited in claim 5, further comprising:
a low-pass filter arranged at least one of at an output of the evaluation circuit and at an input of the control device.

7. The diversity antenna arrangement as recited in claim 1, further comprising:
a further antenna changeover switch via which the at least one further antenna is connected to the second weighting module.

8. The diversity antenna arrangement as recited in claim 7, wherein:
the control device drives the further antenna changeover switch.

9. The diversity antenna arrangement as recited in claim 7, further comprising:
a further control device for driving the further antenna changeover switch.

10. The diversity antenna arrangement as recited in claim 1, wherein:
combinations of the different antenna and the at least one further antenna that can be simultaneously connected to the receiving device have varying directional characteristics.

11. A method of receiving radio signals, the method comprising:
- weighting, using a first coefficient, a signal received from a first antenna;
- feeding signals received from a plurality of different antennas to a changeover switch;
- weighting, using a second coefficient, an output signal of the changeover switch that represents a signal received from one of the plurality of different antennas;
- feeding the first weighted signal and the second weighted signal to a summing circuit; and
- actuating the changeover switch as a function of a reception quality of weighted composite signal.

12. The method as recited in claim 11, wherein the changeover switch is actuated if at least one of:
- an amplitude break of the weighted composite signal exceeds a preestablished amplitude threshold; and
- a frequency swing pulse of the composite signal exceeds a preestablished frequency swing threshold.

* * * * *